US009728981B2

(12) United States Patent
Lee

(10) Patent No.: US 9,728,981 B2
(45) Date of Patent: Aug. 8, 2017

(54) FEEDBACK CONTROLLED COIL DRIVER FOR INDUCTIVE POWER TRANSFER

(71) Applicant: ALFRED E. MANN FOUNDATION FOR SCIENTIFIC RESEARCH, Santa Clarita, CA (US)

(72) Inventor: Edward K. F. Lee, Fullerton, CA (US)

(73) Assignee: ALFRED E. MANN FOUNDATION FOR SCIENTIFIC RESEARCH, Santa Clarita, CA (US)

( * ) Notice: Subject to any disclaimer, the term of this patent is extended or adjusted under 35 U.S.C. 154(b) by 319 days.

(21) Appl. No.: 14/631,627

(22) Filed: Feb. 25, 2015

(65) Prior Publication Data

US 2015/0171637 A1    Jun. 18, 2015

Related U.S. Application Data

(63) Continuation of application No. PCT/US2013/057592, filed on Aug. 30, 2013.
(Continued)

(51) Int. Cl.
*H01F 27/42* (2006.01)
*H01F 37/00* (2006.01)
(Continued)

(52) U.S. Cl.
CPC .............. *H02J 5/005* (2013.01); *H01F 38/14* (2013.01); *H02M 3/33507* (2013.01)

(58) Field of Classification Search
USPC ...................................... 307/104; 336/10, 30
See application file for complete search history.

(56) References Cited

U.S. PATENT DOCUMENTS 3,646,940 A    3/1972 Timm et al.
3,942,535 A    3/1976 Schulman et al.
(Continued)

FOREIGN PATENT DOCUMENTS

CN    1347192 A    5/2002
CN    1721013 A    1/2006
(Continued)

OTHER PUBLICATIONS

Bosch, J., et al., Sacral (S3) Segmental Nerve Stimulation as a Treatment for Urge Incontinence in Patients With Detrusor Instability: Results of Chronic Electrical Stimulation Using an Implantable Neural Prosthesis, The Journal of Urology, Aug. 1995, vol. 154, pp. 504-507.
(Continued)

*Primary Examiner* — Adam Houston
(74) *Attorney, Agent, or Firm* — Kilpatrick Townsend & Stockton LLP

(57) ABSTRACT

A fully integrated feedback controlled coil driver is disclosed for inductive power transfer to electronic devices. For efficient power transfer, a voltage across a switch that switchably couples the coil between a DC input power source and ground is sampled and compared with a preselected reference voltage to generate an error voltage. The error voltage is integrated over time and compared to a voltage ramp. The value of the integrated error voltage relative to the voltage ramp is used to obtain an optimal on time for the switch such that coil current is maximized for a given DC input power. The coil driver can also provide ASK modulation on the coil current by changing the size of the switch according to input data.

20 Claims, 6 Drawing Sheets

Related U.S. Application Data

(60) Provisional application No. 61/695,815, filed on Aug. 31, 2012.

(51) Int. Cl.
  *H01F 38/00* (2006.01)
  *H02J 5/00* (2016.01)
  *H02M 3/335* (2006.01)
  *H01F 38/14* (2006.01)

(56) References Cited

U.S. PATENT DOCUMENTS

| | | |
|---|---|---|
| 4,019,518 A | 4/1977 | Maurer et al. |
| 4,044,774 A | 8/1977 | Corbin et al. |
| 4,082,097 A | 4/1978 | Mann et al. |
| 4,340,062 A | 7/1982 | Thompson et al. |
| 4,468,723 A | 8/1984 | Hughes |
| 4,558,702 A | 12/1985 | Barreras et al. |
| 4,673,867 A | 6/1987 | Davis |
| 4,744,371 A | 5/1988 | Harris |
| 5,143,089 A | 9/1992 | Alt |
| 5,488,552 A | 1/1996 | Sakamoto et al. |
| 5,690,693 A | 11/1997 | Wang et al. |
| 5,702,428 A | 12/1997 | Tippey et al. |
| 5,702,431 A | 12/1997 | Wang et al. |
| 5,735,887 A | 4/1998 | Barreras, Sr. et al. |
| 5,741,316 A | 4/1998 | Chen et al. |
| 5,876,423 A | 3/1999 | Braun |
| 5,877,472 A | 3/1999 | Campbell et al. |
| 6,027,456 A | 2/2000 | Feler et al. |
| 6,035,237 A | 3/2000 | Schulman et al. |
| 6,055,456 A | 4/2000 | Gerber |
| 6,057,513 A | 5/2000 | Ushikoshi et al. |
| 6,067,474 A | 5/2000 | Schulman et al. |
| 6,076,017 A | 6/2000 | Taylor et al. |
| 6,164,284 A | 12/2000 | Schulman et al. |
| 6,172,556 B1 | 1/2001 | Prentice |
| 6,178,353 B1 | 1/2001 | Griffith et al. |
| 6,185,452 B1 | 2/2001 | Schulman et al. |
| 6,191,365 B1 | 2/2001 | Avellanet |
| 6,208,894 B1 | 3/2001 | Schulman et al. |
| 6,212,431 B1 | 4/2001 | Hahn et al. |
| 6,221,513 B1 | 4/2001 | Lasater |
| 6,246,911 B1 | 6/2001 | Seligman |
| 6,249,703 B1 | 6/2001 | Stanton et al. |
| 6,265,789 B1 | 7/2001 | Honda et al. |
| 6,306,100 B1 | 10/2001 | Prass |
| 6,313,779 B1 | 11/2001 | Leung et al. |
| 6,315,721 B2 | 11/2001 | Schulman et al. |
| 6,354,991 B1 | 3/2002 | Gross et al. |
| 6,360,750 B1 | 3/2002 | Gerber et al. |
| 6,393,325 B1 | 5/2002 | Mann et al. |
| 6,427,086 B1 | 7/2002 | Fischell et al. |
| 6,438,423 B1 | 8/2002 | Rezai et al. |
| 6,442,434 B1 | 8/2002 | Zarinetchi et al. |
| 6,466,817 B1 | 10/2002 | Kaula et al. |
| 6,505,075 B1 | 1/2003 | Weiner |
| 6,516,227 B1 | 2/2003 | Meadows et al. |
| 6,521,350 B2 | 2/2003 | Fey et al. |
| 6,564,807 B1 | 5/2003 | Schulman et al. |
| 6,584,355 B2 | 6/2003 | Stessman |
| 6,600,954 B2 | 7/2003 | Cohen et al. |
| 6,609,031 B1 | 8/2003 | Law et al. |
| 6,609,032 B1 | 8/2003 | Woods et al. |
| 6,652,449 B1 | 11/2003 | Gross et al. |
| 6,662,051 B1 | 12/2003 | Eraker et al. |
| 6,721,603 B2 | 4/2004 | Zabara et al. |
| 6,735,474 B1 | 5/2004 | Loeb et al. |
| 6,745,077 B1 | 6/2004 | Griffith et al. |
| 6,809,701 B2 | 10/2004 | Amundson et al. |
| 6,836,684 B1 | 12/2004 | Rijkhoff et al. |
| 6,847,849 B2 | 1/2005 | Mamo et al. |
| 6,864,755 B2 | 3/2005 | Moore |
| 6,892,098 B2 | 5/2005 | Ayal et al. |
| 6,895,280 B2 | 5/2005 | Meadows et al. |
| 6,896,651 B2 | 5/2005 | Gross et al. |
| 6,901,287 B2 | 5/2005 | Davis et al. |
| 6,941,171 B2 | 9/2005 | Mann et al. |
| 6,971,393 B1 | 12/2005 | Mamo et al. |
| 6,986,453 B2 | 1/2006 | Jiang et al. |
| 6,989,200 B2 | 1/2006 | Byers et al. |
| 6,990,376 B2 | 1/2006 | Tanagho et al. |
| 6,999,819 B2 | 2/2006 | Swoyer et al. |
| 7,051,419 B2 | 5/2006 | Schrom et al. |
| 7,054,689 B2 | 5/2006 | Whitehurst et al. |
| 7,069,081 B2 | 6/2006 | Biggs et al. |
| 7,114,502 B2 | 10/2006 | Schulman et al. |
| 7,127,298 B1 | 10/2006 | He et al. |
| 7,142,925 B1 | 11/2006 | Bhadra et al. |
| 7,146,219 B2 | 12/2006 | Sieracki et al. |
| 7,151,914 B2 | 12/2006 | Brewer |
| 7,167,749 B2 | 1/2007 | Biggs et al. |
| 7,177,690 B2 | 2/2007 | Woods et al. |
| 7,177,698 B2 | 2/2007 | Klosterman et al. |
| 7,181,286 B2 | 2/2007 | Sieracki et al. |
| 7,187,978 B2 | 3/2007 | Malek et al. |
| 7,191,005 B2 | 3/2007 | Stessman |
| 7,212,110 B1 | 5/2007 | Martin et al. |
| 7,225,032 B2 | 5/2007 | Schmeling et al. |
| 7,231,254 B2 | 6/2007 | DiLorenzo |
| 7,234,853 B2 | 6/2007 | Givoletti |
| 7,245,972 B2 | 7/2007 | Davis |
| 7,286,880 B2 | 10/2007 | Olson et al. |
| 7,305,268 B2 | 12/2007 | Gliner et al. |
| 7,317,948 B1 | 1/2008 | King et al. |
| 7,324,852 B2 | 1/2008 | Barolat et al. |
| 7,324,853 B2 | 1/2008 | Ayal et al. |
| 7,328,068 B2 | 2/2008 | Spinelli et al. |
| 7,330,764 B2 | 2/2008 | Swoyer et al. |
| 7,331,499 B2 | 2/2008 | Jiang et al. |
| 7,359,751 B1 | 4/2008 | Erickson et al. |
| 7,369,894 B2 | 5/2008 | Gerber |
| 7,386,348 B2 | 6/2008 | North et al. |
| 7,387,603 B2 | 6/2008 | Gross et al. |
| 7,396,265 B2 | 7/2008 | Darley et al. |
| 7,415,308 B2 | 8/2008 | Gerber et al. |
| 7,444,181 B2 | 10/2008 | Shi et al. |
| 7,450,991 B2 | 11/2008 | Smith et al. |
| 7,460,911 B2 | 12/2008 | Cosendai et al. |
| 7,463,928 B2 | 12/2008 | Lee et al. |
| 7,470,236 B1 | 12/2008 | Kelleher et al. |
| 7,483,752 B2 | 1/2009 | Von Arx et al. |
| 7,496,404 B2 | 2/2009 | Meadows et al. |
| 7,513,257 B2 | 4/2009 | Schulman et al. |
| 7,515,967 B2 | 4/2009 | Phillips et al. |
| 7,532,936 B2 | 5/2009 | Erickson et al. |
| 7,539,538 B2 | 5/2009 | Parramon et al. |
| 7,551,960 B2 | 6/2009 | Forsberg et al. |
| 7,555,346 B1 | 6/2009 | Woods et al. |
| 7,565,203 B2 | 7/2009 | Greenberg et al. |
| 7,578,819 B2 | 8/2009 | Bleich et al. |
| 7,580,752 B2 | 8/2009 | Gerber et al. |
| 7,582,053 B2 | 9/2009 | Gross et al. |
| 7,617,002 B2 | 11/2009 | Goetz |
| 7,640,059 B2 | 12/2009 | Forsberg et al. |
| 7,643,880 B2 | 1/2010 | Tanagho et al. |
| 7,706,889 B2 | 4/2010 | Gerber et al. |
| 7,720,547 B2 | 5/2010 | Denker et al. |
| 7,725,191 B2 | 5/2010 | Greenberg et al. |
| 7,734,355 B2 | 6/2010 | Cohen et al. |
| 7,738,963 B2 | 6/2010 | Hickman et al. |
| 7,738,965 B2 | 6/2010 | Phillips et al. |
| 7,747,330 B2 | 6/2010 | Nolan et al. |
| 7,771,838 B1 | 8/2010 | He et al. |
| 7,774,069 B2 | 8/2010 | Olson et al. |
| 7,801,619 B2 | 9/2010 | Gerber et al. |
| 7,813,803 B2 | 10/2010 | Heruth et al. |
| 7,813,809 B2 | 10/2010 | Strother et al. |
| 7,826,901 B2 | 11/2010 | Lee et al. |
| 7,848,818 B2 | 12/2010 | Barolat et al. |
| 7,904,167 B2 | 3/2011 | Klosterman et al. |

(56) References Cited

U.S. PATENT DOCUMENTS

| | | |
|---|---|---|
| 7,912,555 B2 | 3/2011 | Swoyer et al. |
| 7,925,357 B2 | 4/2011 | Phillips et al. |
| 7,932,696 B2 | 4/2011 | Peterson |
| 7,933,656 B2 | 4/2011 | Sieracki et al. |
| 7,935,051 B2 | 5/2011 | Miles et al. |
| 7,937,158 B2 | 5/2011 | Erickson et al. |
| 7,952,349 B2 | 5/2011 | Huang et al. |
| 7,957,818 B2 | 6/2011 | Swoyer |
| 7,979,119 B2 | 7/2011 | Kothandaraman et al. |
| 7,979,126 B2 | 7/2011 | Payne et al. |
| 7,988,507 B2 | 8/2011 | Darley et al. |
| 8,000,782 B2 | 8/2011 | Gharib et al. |
| 8,000,805 B2 | 8/2011 | Swoyer et al. |
| 8,005,535 B2 | 8/2011 | Gharib et al. |
| 8,005,549 B2 | 8/2011 | Boser et al. |
| 8,005,550 B2 | 8/2011 | Boser et al. |
| 8,019,423 B2 | 9/2011 | Possover |
| 8,024,047 B2 | 9/2011 | Olson et al. |
| 8,036,756 B2 | 10/2011 | Swoyer et al. |
| 8,044,635 B2 | 10/2011 | Peterson |
| 8,050,769 B2 | 11/2011 | Gharib et al. |
| 8,055,337 B2 | 11/2011 | Moffitt et al. |
| 8,068,912 B2 | 11/2011 | Kaula et al. |
| 8,083,663 B2 | 12/2011 | Gross et al. |
| 8,103,360 B2 | 1/2012 | Foster |
| 8,116,862 B2 | 2/2012 | Stevenson et al. |
| 8,121,701 B2 | 2/2012 | Woods et al. |
| 8,129,942 B2 | 3/2012 | Park et al. |
| 8,131,358 B2 | 3/2012 | Moffitt et al. |
| 8,140,168 B2 | 3/2012 | Olson et al. |
| 8,145,324 B1 | 3/2012 | Stevenson et al. |
| 8,150,530 B2 | 4/2012 | Wesselink |
| 8,175,717 B2 | 5/2012 | Haller et al. |
| 8,180,451 B2 | 5/2012 | Hickman et al. |
| 8,180,452 B2 | 5/2012 | Shaquer |
| 8,180,461 B2 | 5/2012 | Mamo et al. |
| 8,214,042 B2 | 7/2012 | Ozawa et al. |
| 8,214,048 B1 | 7/2012 | Whitehurst et al. |
| 8,214,051 B2 | 7/2012 | Sieracki et al. |
| 8,219,196 B2 | 7/2012 | Torgerson |
| 8,219,202 B2 | 7/2012 | Giftakis et al. |
| 8,233,990 B2 | 7/2012 | Goetz |
| 8,255,057 B2 | 8/2012 | Fang et al. |
| 8,311,636 B2 | 11/2012 | Gerber et al. |
| 8,314,594 B2 | 11/2012 | Scott et al. |
| 8,332,040 B1 | 12/2012 | Winstrom |
| 8,340,786 B2 | 12/2012 | Gross et al. |
| 8,362,742 B2 | 1/2013 | Kallmyer |
| 8,369,943 B2 | 2/2013 | Shuros et al. |
| 8,386,048 B2 | 2/2013 | McClure et al. |
| 8,417,346 B2 | 4/2013 | Giftakis et al. |
| 8,423,146 B2 | 4/2013 | Giftakis et al. |
| 8,447,402 B1 | 5/2013 | Jiang et al. |
| 8,447,408 B2 | 5/2013 | North et al. |
| 8,457,756 B2 | 6/2013 | Rahman |
| 8,457,758 B2 | 6/2013 | Olson et al. |
| 8,480,437 B2 | 7/2013 | Dilmaghanian et al. |
| 8,494,625 B2 | 7/2013 | Hargrove |
| 8,515,545 B2 | 8/2013 | Trier |
| 8,538,530 B1 | 9/2013 | Orinski |
| 8,543,223 B2 | 9/2013 | Sage et al. |
| 8,549,015 B2 | 10/2013 | Barolat |
| 8,554,322 B2 | 10/2013 | Olson et al. |
| 8,555,894 B2 | 10/2013 | Schulman et al. |
| 8,562,539 B2 | 10/2013 | Marino |
| 8,571,677 B2 | 10/2013 | Torgerson et al. |
| 8,577,474 B2 | 11/2013 | Rahman et al. |
| 8,588,917 B2 | 11/2013 | Whitehurst et al. |
| 8,626,314 B2 | 1/2014 | Swoyer et al. |
| 8,644,933 B2 | 2/2014 | Ozawa et al. |
| 8,655,451 B2 | 2/2014 | Klosterman et al. |
| 8,700,175 B2 | 4/2014 | Fell |
| 8,725,269 B2 | 5/2014 | Nolan et al. |
| 8,738,141 B2 | 5/2014 | Smith et al. |
| 8,738,148 B2 | 5/2014 | Olson et al. |
| 8,750,985 B2 | 6/2014 | Parramon et al. |
| 8,761,897 B2 | 6/2014 | Kaula et al. |
| 8,768,452 B2 | 7/2014 | Gerber |
| 8,774,912 B2 | 7/2014 | Gerber |
| 8,954,148 B2 | 2/2015 | Labbe et al. |
| 8,989,861 B2 | 3/2015 | Su et al. |
| 9,089,712 B2 | 7/2015 | Joshi et al. |
| 9,108,063 B2 | 8/2015 | Olson et al. |
| 2002/0116042 A1 | 8/2002 | Boling |
| 2003/0078633 A1 | 4/2003 | Firlik et al. |
| 2004/0106963 A1 | 6/2004 | Tsukamoto et al. |
| 2005/0104577 A1 | 5/2005 | Matei et al. |
| 2006/0016452 A1 | 1/2006 | Goetz et al. |
| 2006/0030277 A1* | 2/2006 | Cyr ............ H01L 24/06 455/77 |
| 2006/0050539 A1 | 3/2006 | Yang et al. |
| 2006/0092677 A1* | 5/2006 | Moussaoui ........ H02M 7/4826 363/71 |
| 2006/0142822 A1 | 6/2006 | Tulgar |
| 2006/0206166 A1 | 9/2006 | Weiner |
| 2007/0073357 A1 | 3/2007 | Rooney et al. |
| 2007/0189431 A1* | 8/2007 | Waheed ............. H03C 3/0991 375/376 |
| 2007/0265675 A1 | 11/2007 | Lund et al. |
| 2007/0293914 A1 | 12/2007 | Woods et al. |
| 2008/0132961 A1 | 6/2008 | Jaax et al. |
| 2008/0172109 A1 | 7/2008 | Rahman et al. |
| 2008/0183236 A1 | 7/2008 | Gerber |
| 2008/0315928 A1* | 12/2008 | Waheed ............. G04F 10/005 327/159 |
| 2009/0088816 A1 | 4/2009 | Harel et al. |
| 2009/0105785 A1 | 4/2009 | Wei et al. |
| 2009/0112291 A1 | 4/2009 | Wahlstrand et al. |
| 2009/0259273 A1 | 10/2009 | Figueiredo et al. |
| 2010/0076254 A1 | 3/2010 | Jimenez et al. |
| 2010/0076534 A1 | 3/2010 | Mock |
| 2011/0152959 A1 | 6/2011 | Sherwood et al. |
| 2011/0270269 A1 | 11/2011 | Swoyer et al. |
| 2011/0278948 A1 | 11/2011 | Forsell |
| 2011/0282416 A1 | 11/2011 | Hamann et al. |
| 2011/0301667 A1 | 12/2011 | Olson et al. |
| 2012/0016447 A1 | 1/2012 | Zhu et al. |
| 2012/0041512 A1 | 2/2012 | Weiner |
| 2012/0046712 A1 | 2/2012 | Woods et al. |
| 2012/0071950 A1 | 3/2012 | Archer |
| 2012/0119698 A1 | 5/2012 | Karalis et al. |
| 2012/0130448 A1 | 5/2012 | Woods et al. |
| 2012/0259381 A1 | 10/2012 | Smith et al. |
| 2012/0262108 A1 | 10/2012 | Olson et al. |
| 2012/0274270 A1 | 11/2012 | Dinsmoor et al. |
| 2012/0276854 A1 | 11/2012 | Joshi et al. |
| 2012/0276856 A1 | 11/2012 | Joshi et al. |
| 2013/0004925 A1 | 1/2013 | Labbe et al. |
| 2013/0006330 A1 | 1/2013 | Wilder et al. |
| 2013/0006331 A1 | 1/2013 | Weisgarber et al. |
| 2013/0023958 A1 | 1/2013 | Fell |
| 2013/0096651 A1 | 4/2013 | Ozawa et al. |
| 2013/0150925 A1 | 6/2013 | Vamos et al. |
| 2013/0197608 A1 | 8/2013 | Eiger |
| 2013/0207863 A1 | 8/2013 | Joshi |
| 2013/0211479 A1 | 8/2013 | Olson et al. |
| 2013/0303942 A1 | 11/2013 | Damaser et al. |
| 2013/0310894 A1 | 11/2013 | Trier |
| 2013/0331909 A1 | 12/2013 | Gerber |
| 2014/0222112 A1 | 8/2014 | Fell |
| 2014/0237806 A1 | 8/2014 | Smith et al. |
| 2015/0171637 A1* | 6/2015 | Lee ................... H02M 3/33507 307/104 |
| 2015/0214604 A1 | 7/2015 | Zhao et al. |
| 2015/0318712 A1* | 11/2015 | Lee ................ H02J 17/00 307/104 |
| 2015/0326235 A1* | 11/2015 | Pavao-Moreira ....... H03L 7/099 331/57 |

(56) References Cited

U.S. PATENT DOCUMENTS

| | | | | |
|---|---|---|---|---|
| 2016/0099660 | A1* | 4/2016 | Khaligh | H02M 1/4241 363/126 |
| 2017/0018967 | A1* | 1/2017 | Berkhout | H02J 50/12 |

FOREIGN PATENT DOCUMENTS

| | | |
|---|---|---|
| CN | 101834473 A | 9/2010 |
| DE | 102010006837 A1 | 8/2011 |
| EP | 1680182 | 7/2006 |
| EP | 1904153 | 4/2008 |
| EP | 2243509 | 10/2010 |
| JP | 2003047179 A | 2/2003 |
| WO | 2000-056677 A1 | 3/2000 |
| WO | WO 2000/066221 A1 | 11/2000 |
| WO | WO 2002/003408 A2 | 1/2002 |
| WO | WO 2004/103465 A1 | 12/2004 |
| WO | WO 2008/021524 | 2/2008 |
| WO | WO 2009/051539 A1 | 4/2009 |
| WO | WO 2009/091267 A2 | 7/2009 |
| WO | WO 2010/042056 A1 | 4/2010 |
| WO | WO 2010/042057 A1 | 4/2010 |
| WO | WO 2011/059565 | 5/2011 |
| WO | WO 2013/141884 | 9/2013 |

OTHER PUBLICATIONS

Ghovanloo, M., et al., A Small Size Large Voltage Compliance Programmable Current Source for Biomedical Implantable Microstimulators, Proceedings of the 25th Annual International Conference of the IEEE EMBS, Sep. 17-21, 2003, pp. 1979-1982.

Tanagho, E., et al., Bladder Pacemaker: Scientific Basis and Clinical Future, Urology, Dec. 1982, vol. 20, No. 6, pp. 614-619.

Boiocchi, S., et al., "Self-calibration in high speed current steering CMOS D/A converters", Advanced A-D and D-A Conversion Techniques and Their Applications, 1994, Second International Conference on Cambridge, UK, London, UK, IEE, UK, Jan. 1, 1994 (Jan. 1, 1994), pp. 148-152.

Gudnason, G., "A low-power ASK demodulator for Inductively coupled implantable electronics", Solid-State Circuits Conference, 2000, Esscirc "00, Proceedings of the 26RD European, IEEE, Sep. 19, 2000, pp. 385-388.

Humayun, M.S., et al., "A Variable Range Bi-Phasic Current Stimulus Driver Circuitry for an Implantable Retinal Prosthetic Device", IEEE Journal of Solid-State Circuits, IEEE Service Center, Piscataway, NJ, USA, vol. 40, No. 3, Mar. 1, 2005, (Mar. 1, 2005), pp. 763-771.

Van Paemel, M., "High-Efficiency Transmission for Medical Implants", IEEE Solid-State Circuits Magazine, IEEE, USA, vol. 3, No. 1, Jan. 1, 2011, pp. 47-59.

Wang, Chua-Chin, et al., "A 140-dB CMRR Low-noise Instrumentation Amplifier for Neural Signal Sensing", Circutis and Systems, 2006, APCCAS 2006, IEEE Asia Pacific Conference on IEEE, Piscataway, NJ, USA, Dec. 1, 2006 (Dec. 1, 2006), pp. 696-699.

Kendir, G. et al, An optimal design methodology for inductive power link with class-E amplifier, IEEE Tran. Cir. Syst. I, vol. 52, pp. 857-866, May 2005.

Lange, et al, An AC-Powered Optical Receiver Consuming 270uW for Transcutaneous 2 Mb/s Data Transfer, ISSCC Dig. Tech. Papers, pp. 304-305, Feb. 2011.

Lee, E., et al, A biomedical implantable FES battery-powered micro-stimulator, IEEE Tran. Cir. Syst. I, vol. 56, pp. 2583-2596, Dec. 2009.

Lee, H., et al, Fully integrated power efficient AC-to-DC converter design in inductively powered biomedical applications, Proc. of IEEE 2011 CICC, paper 8.7, 2011.

Lee, S., et al, A low-power bidirectional telemetry device with a near-field charging feature for a cardiac microstimulator, IEEE Tran. Bio. Cir. Syst., vol. 5, pp. 357-367, Aug. 2011.

Lee, S.B., et al, An Inductively Powered Scalable 32-Channel Wireless Neural Recording System-on-a-Chip for Neuroscience Applications, ISSCC Dig.Tech. Papers, pp. 120-121, Feb. 2010.

Lee, S.Y., et al, A Programmable Implantable Micro-Stimulator SoC with Wireless Telemetry: Application in Closed-Loop Endocardial Stimulation for Cardiac Pacemaker, ISSCC Dig. Tech. Papers, pp. 44-45, Feb. 2011.

Liao, Y., et al, a 3μW wireless powered CMOS glucose sensor for an active contact lens, ISSCC Dig. Tech. papers, pp. 38-39, 2011.

Lin, C.W., et al, Pain Control on Demand Based on Pulsed Radio-Frequency Stimulation of the Dorsal Root Ganglion Using a Batteryless Implantable CMOS SoC, ISSCC Dig. Tech. Papers, pp. 234-235, Feb. 2010.

Loke, W., et al, A 0.5V sub-mW wireless magnetic tracking transponder for radiation therapy, Sym. on VLSI Cir., pp. 172-173, 2011.

Mohan, N., et al, Power electronics: converters, applications, and design, John Wiley & Sons, pp. 252-258, 1995.

Paralikar, P., et al, An Implantable 5 mW/Channel Dual-Wavelength Optogenetic Stimulator for Therapeutic Neuromodulation Research, ISSCC Dig. Tech. Papers, pp. 238-239, Feb. 2010.

Sarpeshklar, R., Ultra low power bioelectronics: fundamentals, biomedical applications, and bio-inspired systems, Cambridge University Press, pp. 441-453, 2010.

Wu, Y., et al, A two-phase switching hybrid supply modulator for polar transmitters with 9% efficiency improvement, ISSCC Dig. Tech. papers, pp. 196-197, 2010.

Xiao, Z., et al, A 20 u!W Neural Recording Tag with Supply-Current-Modulated AFE in O.I3 um CMOS, ISSCC Dig. Tech. Papers, pp. 122-123, Feb. 2010.

\* cited by examiner

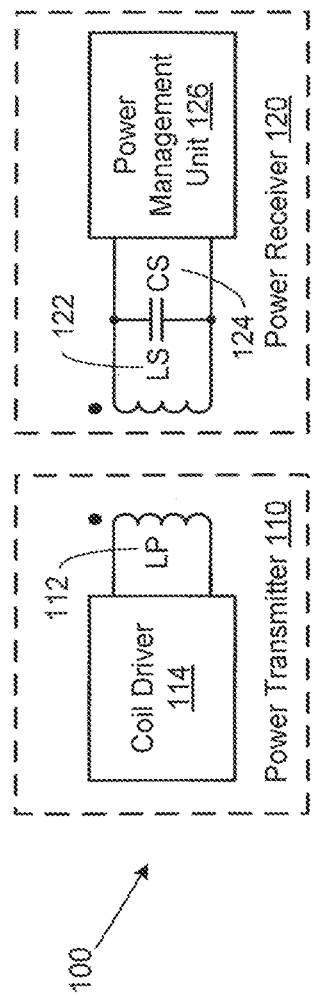
FIG. 1 PRIOR ART
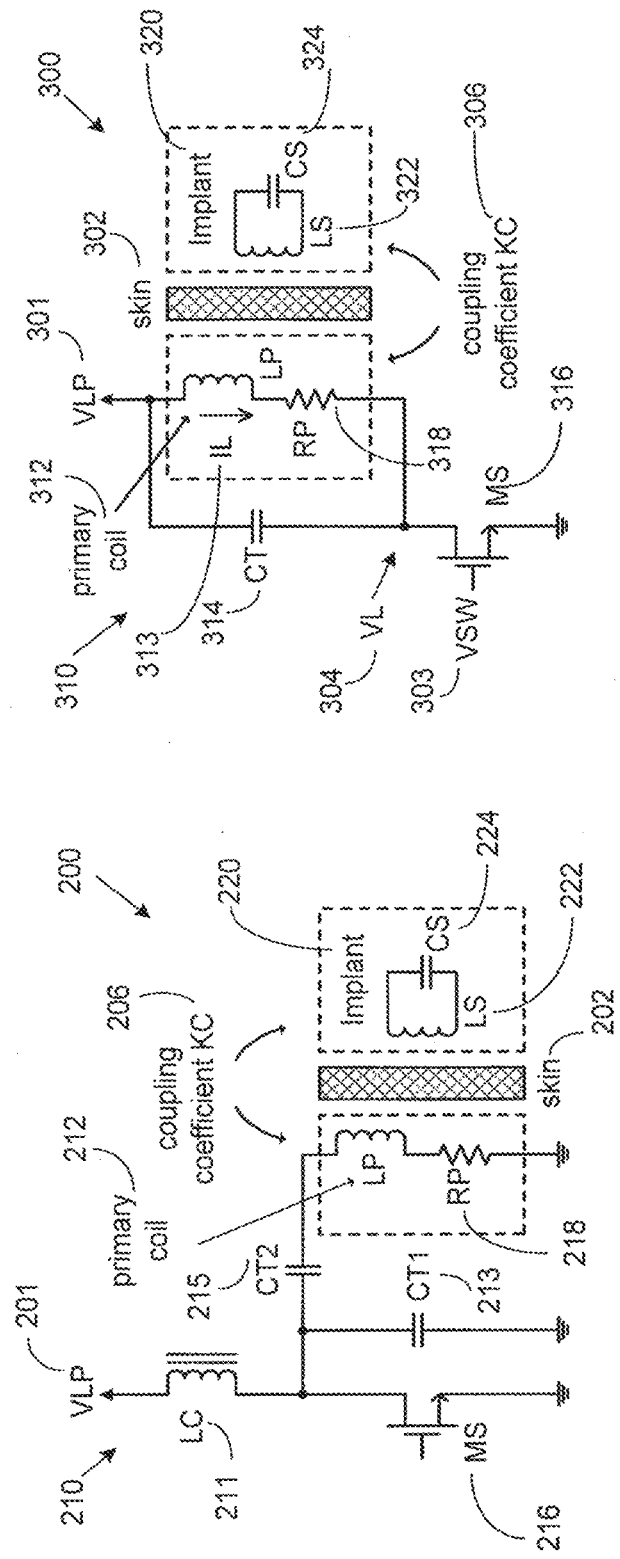
FIG. 2 PRIOR ART
FIG. 3

FEEDBACK CONTROLLED COIL DRIVER FOR INDUCTIVE POWER TRANSFER

CROSS REFERENCE TO RELATED APPLICATIONS

This application is a continuation of International Appl. No. PCT/US2013/057592, filed Aug. 30, 2013, which claims the benefit of U.S. Provisional Application No. 61/695,815 entitled "FEEDBACK CONTROLLED COIL DRIVER FOR INDUCTIVE POWER TRANSFER," filed on Aug. 31, 2012, the entirety of which is hereby incorporated by reference herein.

BACKGROUND OF THE INVENTION

Inductive power transfer or transmission is frequently used to deliver power wirelessly to portable electronic devices. Wireless power transfer is used in a variety of applications, such as, for recharging the batteries in portable devices, such as smart phones, tablets and laptops. Such power transfer systems are also used to transmit power transcutaneously, i.e., through the skin, to implanted medical devices, to either power an implant directly or to recharge the implant's battery.

As shown in FIG. 1, a conventional power transfer system 100 typically includes a coil driver 114 driving a primary coil LP (112), which inductively couples and powers secondary coil, LS (122) located inside electronic device 120. Various transcutaneous power transfer systems are described in: W. Loke, et al., "A 0.5V sub-mW wireless magnetic tracking transponder for radiation therapy," Sym. on VLSI Cir., pp. 172-173, 2011; Y. Liao, et al., "A 3 µW wireless powered CMOS glucose sensor for an active contact lens," ISSCC Dig. Tech. papers, pp. 38-39, 2011 and S. Lee, et al., "A low-power bidirectional telemetry device with a near-field charging feature for a cardiac microstimulator," IEEE Tran. Bio. Cir. Syst., vol. 5, pp. 357-367, August, 2011. Although some implants are designed to obtain power directly from the batteries within the implants, those batteries that are rechargeable still have to be recharged wirelessly by an external power transmitter. See E. Lee, et al., "A biomedical implantable FES battery-powered micro-stimulator," IEEE Tran. Cir. Syst. I, vol. 56, pp. 2583-2596, December 2009. In recent developments, many efforts have been devoted to improve the power reception and the power management within the implants. See, for example, H. Lee and M. Ghovanloo, "Fully integrated power efficient AC-to-DC converter design in inductively powered biomedical applications," Proc. of IEEE 2011 CICC, paper 8.7, 2011. However, the coil driver in an external transmitter still requires a lot of discrete components. See the article by S. Lee, et al., 2011 cited above and also G. Kendir, et al., "An optimal design methodology for inductive power link with class-E amplifier," IEEE Tran. Cir. Syst. I, vol. 52, pp. 857-866, May, 2005.

Class E amplifier type systems 210 as shown in FIG. 2 are commonly used in coil driver designs, See S. Lee, et al., 2011 and G. Kendir, et al., 2005 cited above. In addition to discrete capacitors CT1 (213) and CT2 (215), a bulky RF choke LC (211) is also required in this circuit topology. Since a power transmitter is normally part of a patient's external controller for an implanted medical device 220, it is important for the external controller to be small and light-weight. Therefore, a coil driver for such a wireless power transfer system should use a minimal number of discrete components to achieve a small size and should have low power consumption such that only a small battery is required.

SUMMARY OF THE INVENTION

The invention deals with a design for a feedback controlled coil driver that achieves an optimum coil driver switch "on time". The coil is part of an LC tank circuit and the optimum coil driver switch "on time" is achievable for different operating frequencies without the need for adjusting the values of the inductance and capacitance of the LC tank circuit. The optimum coil driver switch "on time" further results in a maximized value of the ratio of the square of the peak to peak coil current to the power delivered by a LC tank circuit power supply.

The optimum coil driver switch "on time" is obtained by switchably coupling the LC tank circuit between a power supply and ground at controlled times. A sample and hold circuit monitors the LC tank circuit output voltage and an integrator circuit integrates the difference between the output voltage and a prescribed reference voltage which is typically set to zero volts. One of many unique attributes of the present invention is that a ramp voltage is generated at the time the LC tank circuit is coupled to ground which is then compared to the output of the integrator circuit. The coil driver switch decouples the LC tank circuit from ground when the value of the ramp voltage exceeds the value of the integrated difference voltage.

A repetitive pulse signal generator provides a pulse train to the coil driver switch at a predetermined frequency. Each pulse of the pulse train has a start time and a pulse width ("on time") which is controlled by the feedback loop as described above which causes the "on time " to be optimized with the identified benefits and advantages.

BRIEF DESCRIPTION OF THE DRAWINGS

FIG. 1 is a block diagram of a power transfer system for an electronic device.

FIG. 2 is a block diagram of a power transfer system using a prior art coil driver based on a class E amplifier.

FIG. 3 is a block diagram of a power transfer system using a coil driver based on a resonant DC-AC converter topology.

DETAILED DESCRIPTION

FIG. 3 is a block diagram of a power transfer system 300 using a coil driver 310 based on resonant DC-AC converter topology. See N. Mohan, T. Undeland and W. Robbins, Power electronics: converters, applications, and design, John Wiley & Sons, 2003 and also M. Paemel, "High-efficiency transfer for medical implants," IEEE Solid-State Cir. Mag., vol. 3, pp. 47-59, 2011 for more information on resonant DC-AC converter design. Primary coil LP (312)

and discrete capacitor CT (314) form a resonant LC tank circuit for transmitting power to the secondary coil LS (322) in implant 320. One possible operating frequency FO, for such an inductive link is at about 120 kHz. See E. Lee, et al., "A biomedical implantable FES battery-powered microstimulator," IEEE Tran. Cir. Syst. I, vol. 56, pp. 2583-2596, December 2009. For higher operating frequencies (e.g., 13.56 MHz), capacitor CT (314) can be potentially integrated on-chip for further component reduction.

As will be discussed with respect to FIGS. 4A-4D and 5A-5B, a feedback loop minimizes the power dissipation on coil driver 310 by controlling the "on time" (TON) of switch MS (316). Coil driver 310 is also capable of providing amplitude shift keying (ASK) modulation on the power transfer since, in some applications, data is sent from the external controller to an implant via the same inductive link. See, for example S. Lee, et al., 2011 cited above and also R. Sarpeshkar, Ultra low power bioelectronics: fundamentals, biomedical applications, and bio-inspired systems, Cambridge University Press, 2010.

The operating frequency FO of coil driver 310 is derived from an input clock frequency, FCLOCK, where, for the current application, FCLOCK=20×FO. For proper operation of coil driver 310, capacitor CT (314) is selected such that the resonant frequency of primary coil LP (312) and CT (314) is $FLC=\frac{1}{2}\pi/(LP \times CT)^{0.5}$ is greater than FO, (See M. Paemel, "High-efficiency transmission for medical implants," IEEE Solid-State Cir. Mag., vol. 3, pp. 47-59, 2011). Due to the physical sizes and the location constraints of the coils in an implant and an external controller, the coupling coefficient KC (306) and the Q factors of the coils are relatively small in these types of systems. Hence, the power efficiency of the inductive coupling is also low.

Figure 4A:
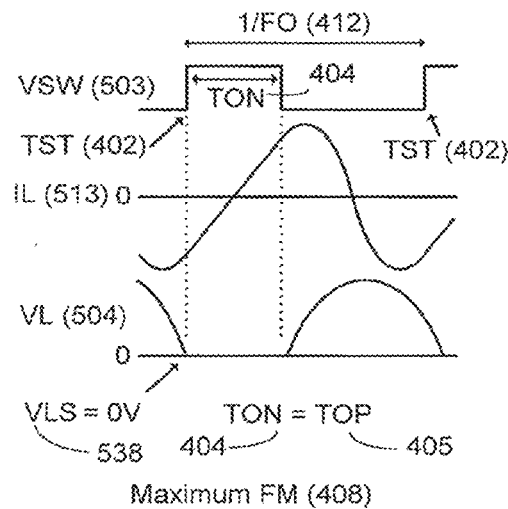
FIG. 4A-4D are timing waveforms for various values of on times for a switch for a coil driver, according to an embodiment of the present invention.

To maximize the power transfer to secondary coil LS (322), the current on primary coil LP (312) in FIG. 3, given as primary coil current IL (313), must be maximized for a given power delivery from the primary coil supply voltage VLP (301), (See R. Sarpeshkar, 2012 cited above). Primary coil current IL (313) is generated by turning on, at controlled times, switch MS (316) such that primary coil LP (312) is energized by supply voltage VLP (301). When switch MS (316) is off, primary coil LP (312) and capacitor CT (314) are decoupled from ground and will resonate, producing a sinusoidal primary coil current IL (313) until switch MS (316) is turned on again in the next cycle, as shown in FIG. 4A. For a given power PLP, from supply voltage VLP (316), the peak to peak value of primary coil current IL given as ILP-P is maximized by controlling the on time TON (404), for switch MS (316) so that switch MS (316) only allows current flow when the coil driver output voltage VL (304) across switch MS (316), reaches exactly 0V and remains essentially 0V during the duration of on time TON (404). In this case, the power dissipation by switch MS (316) is minimized and the turn on time TON (404) will be equal to the optimal on time given as TOP (405) and the following condition, as shown in equation (1) below, will be satisfied, $$\frac{FLC}{FO} = \frac{1}{1-FO \times TOP}\left(\frac{1}{2} + \frac{1}{\pi}\arctan\frac{1}{\pi FLC \times TOP}\right) \quad (1)$$

The maximum value of coil driver output voltage VL (304) across switch MS (316), VLMAX, and the peak to peak primary coil current ILP-P can be written as:

$$VLMAX = VLP(1 + 1/\sin\theta) \quad (2)$$

$$ILP-P = \frac{VLP \times TOP}{LP \times \cos\theta} \quad (3)$$

where $\theta=\arctan[2/TOP \cdot (CT \cdot LP)^{0.5}]$.

A figure of merit, FM (408), defined as $FO \cdot LP \cdot ILP\text{-}P^2/PLP$ will be used to measure the effectiveness of generating primary coil current IL, when the on time TON the optimal on time TOP, then FM will be maximized. For a given operating frequency FO, manual adjustments on primary coil LP, capacitor CT or on time TON are often required to maximize the power transfer to an implant, (See S. Lee, et al., 2011 and R. Sarpeshkar, 2010 cited above). The impedance of primary coil LP (312), and hence, the resonant frequency of primary coil LP (312) and capacitor CT (314), may deviate from the nominal value after manual adjustments when primary coil LP (312) is near any metallic objects or an implant that has large coupling coefficients (KC>0.1) with primary coil LP (312) (See R. Sarpeshkar, 2010 cited above). The present invention provides an automatic adjustment scheme to achieve optimal on time TOP for primary coil LP (312).

FIG. 4A-4D are timing waveforms for various values of on times TON (404) for switch MS (516) for coil driver 500. FIGS. 4A-4D show four timing waveforms: voltage VSW (503) applied to switch MS (516), coil current IL (513) and coil driver output voltage VL (504) for various values of on time TON (404) in relation to an optimal on time TOP (405). During each cycle 1/FO (412) of voltage VSW (503) applied to switch MS (516), turn on time TON (404) begins at turn on start time TST (402). Voltage VSW (503) applied to switch MS (516) is a repetitive pulse signal with a frequency equal to the operating frequency FO.

Figure 4B:
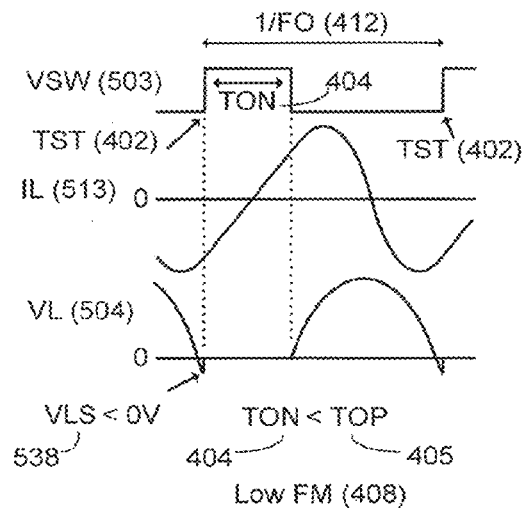
Figure 4C:
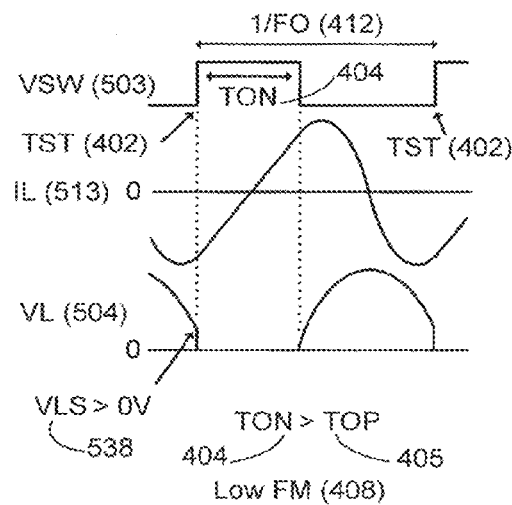
Figure 4D:
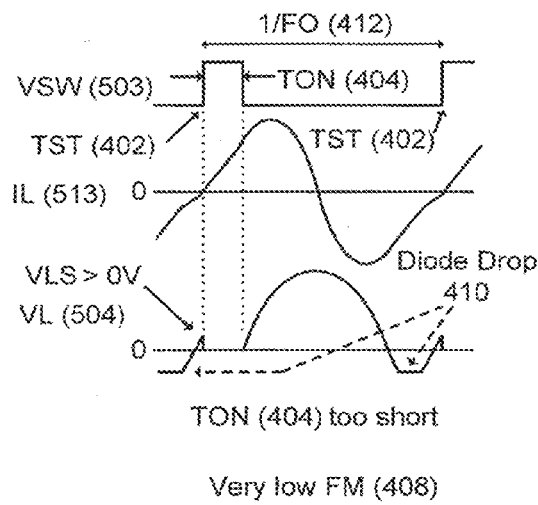
Figures 5A, 5B:
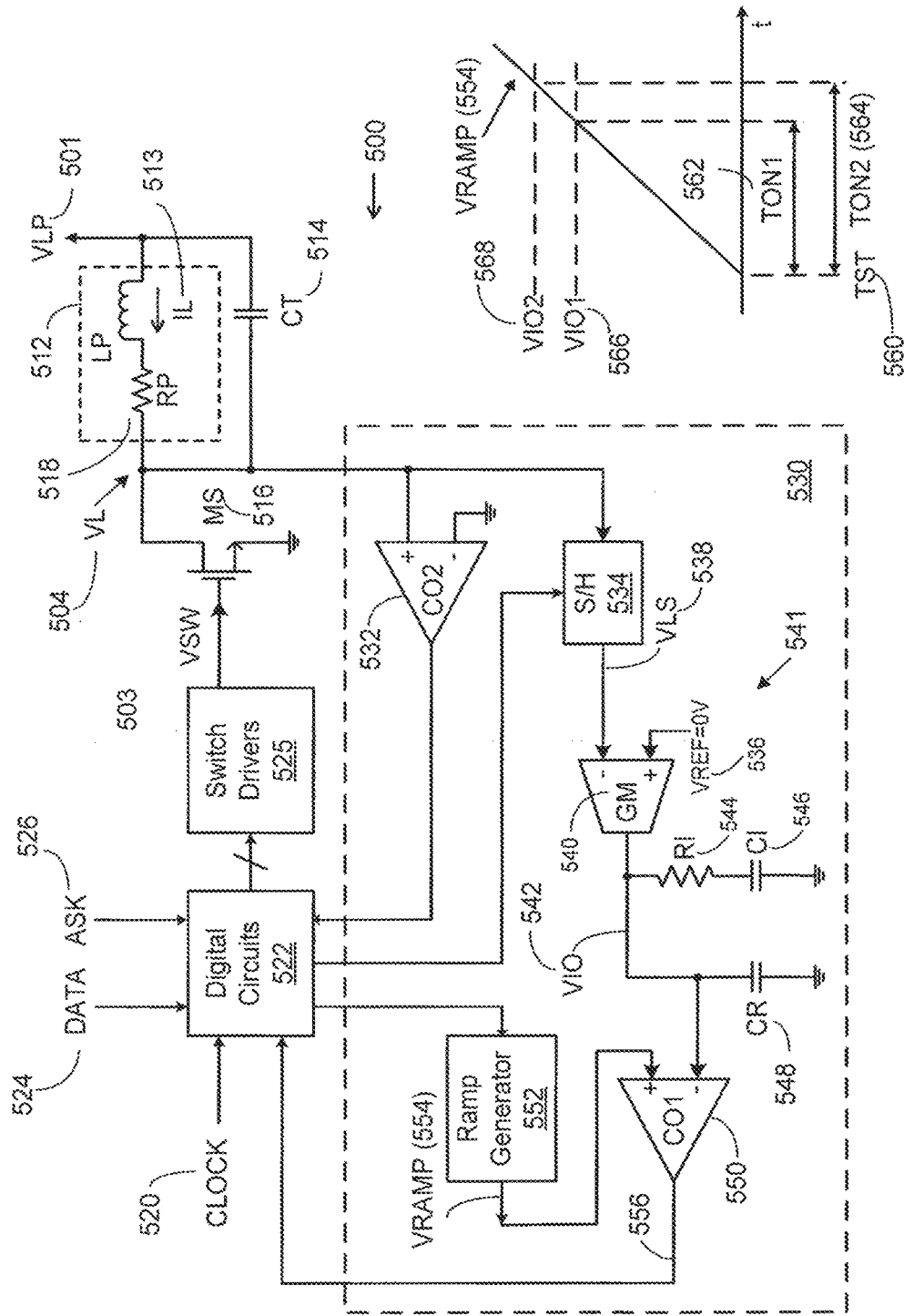
FIG. 5A is a block diagram of a feedback controlled coil driver according to an embodiment of the present invention.
FIG. 5B is a timing waveform for the output of the ramp generator in FIG. 5A.

FIG. 5A is a block diagram of a feedback controlled coil driver 500 according to an embodiment of the present invention. FIG. 5B is a timing waveform for the output of the ramp generator 552 in FIG. 5A. Primary coil LP (512) and capacitor CT (514) form an LC tank circuit for power transfer to a secondary coil, which is not shown in FIG. 5A. In the present invention, a feedback controlled technique is used to achieve optimal on time TOP (504) automatically. A sample and hold circuit S/H (534) is used to sample the coil driver output voltage VL (504) across switch MS (516) at the instant switch MS (516) is turned on. This instant is denoted as turn on start time TST (402) and the sampled voltage of coil driver output VL (504) at turn on start time TST is denoted as VLS (538) as shown in FIGS. 4A-4D and 5A. The difference between the sampled voltage VLS (538) and the reference voltage VREF (536), which represents an error voltage VER (not shown), is integrated by integrator 541 comprised of transconductor GM (540) and capacitor CI (546) to produce the integral over time of VER designated as voltage VIO in FIG. 5A. To achieve on time TON equal to optimal on time TOP, reference voltage VREF (536) is set to 0V. The feedback loop for controlling MS (516) is to have coil driver output voltage VL (504) equal to zero when MS (516) starts to turn on. VL (504) is compared to VREF (536) after it is sampled at the instant when MS (516) starts to turn on. This comparison drives the on time in the right direction until VL (504) equals VREF (536). With VREF equal to zero, VL will be driven to zero in steady state and the optimum on time TON will be achieved. The integrator 541 output voltage VIO (542), is used as a threshold for comparator CO1 (550). On time TON (404) is determined by the output of comparator CO1 (550), ramp generator 552 and the value of VIO (542). When switch MS (516) turns on at turn on start time TST (402), ramp generator 552 begins to produce ramp voltage VRAMP (554) shown in FIG. 5B. When VRAMP is greater than VIO, comparator CO1 (550) will signal digital circuit 522 to turn off switch MS (516) via control signal 556. Therefore, on time TON (404) is the time taken from TST (402) to the instant when comparator CO1 (550) causes MS (516) to turn off. Digital circuits 522 include a repetitive pulse signal generator to provide a pulse train VSW (503) to coil driver switch MS (516) at operating frequency FO. Each pulse of pulse train VSW (503) has turn on start time TST (402) and a pulse width ("on time") TON (404) which is controlled by feedback controller 530 via control signal 556.

FIG. 5B illustrates the influence of the value of VIO on the switch on time TON. For example, for a VIO value of VIO1, the corresponding on time is TON1 and for a VIO value of VIO2, the corresponding on time is TON2. Since the signal appearing at the output of integrator 541 is greater at VIO2 than at VIO1, the switch on time TON2 will be longer than the on time TON1. The slope of the VRAMP (554) signal is fixed by the ramp generator (552), but can be adjusted to establish speed of feedback response. The maximum value of ramp voltage VRAMP (544) during any one cycle (412) of operating frequency FO is less than or equal to the supply voltage of ramp generator 552. Accordingly, sample and hold circuit S/H (534), integrator 541, ramp generator 552 and comparator CO1 (550) may, in combination, be considered a feedback controller for providing a control signal 556 for controlling the on time of switch MS (516). The control signal comprises the integral of the difference between the sampled output voltage VLS and VREF as influenced by the ramp voltage VRAMP (554) in comparator CO1. For on time TON less than optimal on time TOP, sampled voltage VLS (538) and therefore error voltage VER, will be less than 0V as shown in FIG. 4B. Integrator 541 will drive voltage VIO (542) to a higher value, resulting in a longer on time TON.

For on time TON greater than optimal on time TOP, sampled voltage VLS will be greater than 0V as shown in FIG. 4C. Integrator 541 output voltage VIO (542) will be driven to a lower value resulting in a shorter on time TON. In steady state, the feedback loop will drive sampled voltage VLS (538) to the value of the reference voltage VREF (536) and as a result, the error voltage VER=0V and voltage VIO (542) will remain constant. At that point, TON (404) is at its optimal value and equal to TOP (405) for VREF=0V. Even if the value of primary coil LP (512) deviates from the nominal value due to a nearby metallic object, the feedback loop will adjust TON (404) according to sampled voltage VLS (538) until VLS=0V and the optimal on time TOP (405) is achieved. Resistor RI (544) and capacitor CR (548) are added to the feedback loop for respective stability compensation and ripple reduction on voltage VIO (542).

In cases where on time TON (404) is too short during power up, the coil driver output voltage VL (504) across switch MS (516) will go negative and turn on the parasitic diode of switch MS (516) before switch MS (516) turns on at turn on start time TST as shown in FIG. 4D. Primary coil LP (512) will be charged through the parasitic diode of switch MS (516) and coil driver output voltage VL (504) may even begin to increase before switch MS (516) turns on at turn on start time TST, resulting in a positive sampled voltage VLS (538). The feedback loop may incorrectly interpret that on time TON is too long and proceed to reduce it further, eventually complete turning off switch MS (516).

As a consequence, primary coil LP (512) will be recharged solely by the parasitic diode and coil driver 500 will operate at a frequency different from the operating frequency FO. In addition, the driver will have a very low figure of merit FM. This condition can be avoided by ensuring a minimum pulse width for TON and by adding a comparator CO2 (532) as shown in FIG. 5A.

When the voltage across switch MS (516), VL is less than 0V, comparator CO2 (532) will signal the sample and hold S/H (534) to sample voltage VL (504) at the next clock 520 cycle even before turn on start time TST. Hence, the sampled voltage VLS will be less than 0V such that integrator 541 will drive its output voltage VIO (542) to a higher value leading to a longer on time TON and ultimately, an optimal on time TOP in steady state.

The power transfer level of coil driver 500 can be controlled by adjusting the coil supply voltage VLP (501) without affecting on time TON since the peak to peak primary coil current ILP-P is directly proportional to supply voltage VLP (501) according to Eq. (3).

Figure 6:
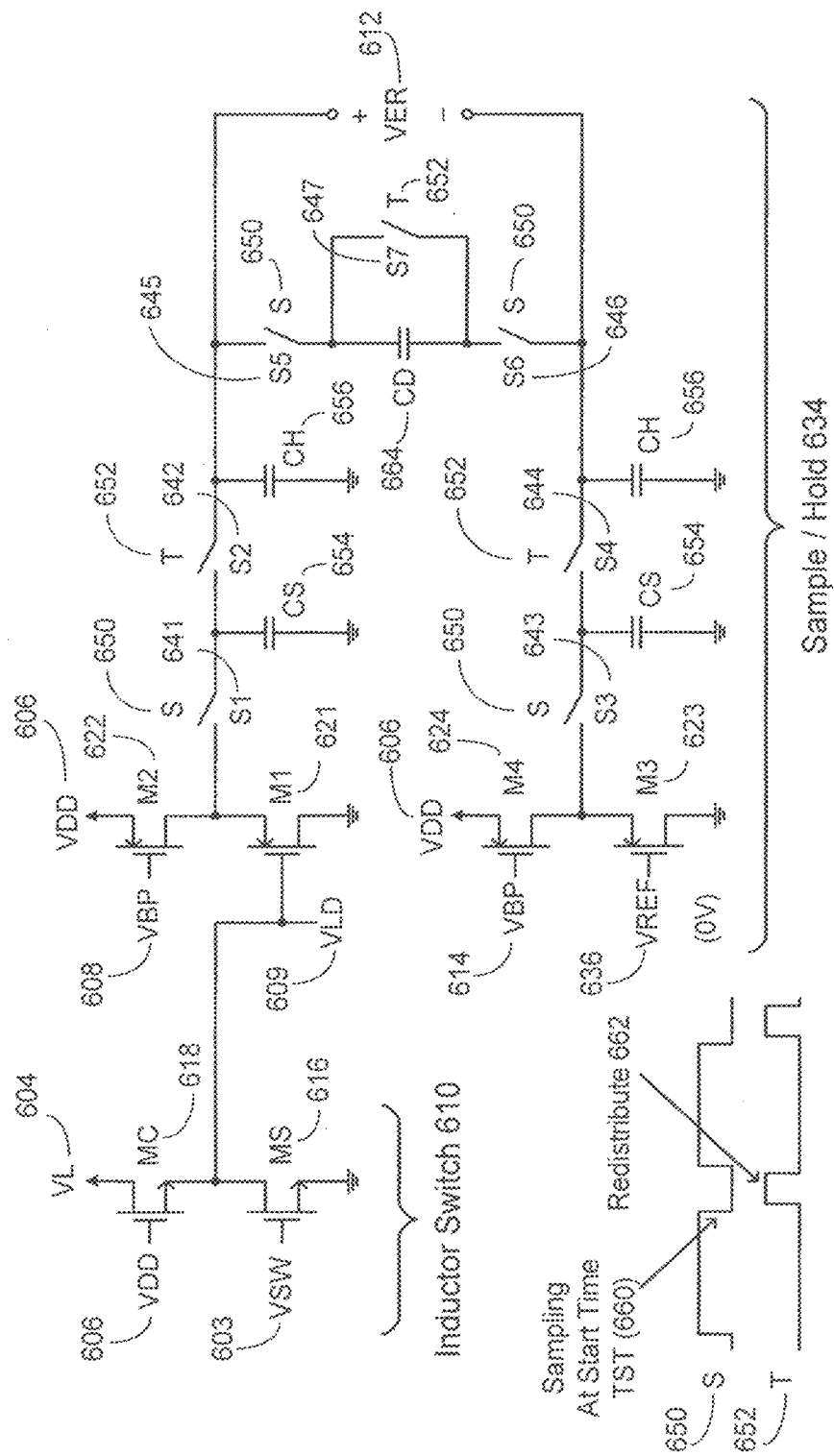
FIG. 6 is an exemplary schematic of the inductor switch and sample and hold of FIG. 5A.

FIG. 6 is a schematic of an exemplary implementation of the inductor switch MS (516) and sample and hold S/H (534) of FIG. 5A. For example, if a 5V 0.8 μm CMOS process is used to implement coil driver 500, the VGS's and the VDS's of the MOSFETs will be limited to ~5V and ~12V, respectively. According to Eq. (2), the coil driver output voltage VL (604) across inductor switch 610 in this example can go up to ~15V for a supply voltage VLP=5V. To accommodate the required high VDS for switch MS (616), a MOSFET transistor MC (618) is added in series to switch MS (616) as shown in FIG. 6. The drain voltage of switch MS (616), denoted by VLD (609), is now limited to <5V for VDD=5V, and the VDS of transistor MC (618) will be limited to <12V. Since large transistor sizes are needed for transistor MC (618) and switch MS (616) to minimize the overall on resistance, the voltage VL (604) is approximately equal to VLD (609) for VL essentially equal to 0V.

Instead of sampling coil driver output voltage VL (604) directly, sample voltage VLS can be obtained by sampling VLD (609), which has a lower voltage swing that is less than VDD. Therefore, the input of the sample and hold S/H (534) does not need to have high voltage tolerance. Since voltages VL (604) and VLD (609) can also go below 0V as shown in FIG. 4B and FIG. 4D, MOSFETs M1-M2 (621, 622) are used as a level shifter as well as a buffer to prevent charge leakage from sampling capacitor CS (654) to VLD (609) via the parasitic NPN associated with switch S1 (641). A similar circuit arrangement is used for the reference voltage input VREF (636) to match the VLD (609) voltage input. After the voltage VL (604) is sampled, the charges on sampling capacitors CS (654) redistribute to the holding capacitors CH (656). The voltage difference between holding capacitors CH (656) represents the voltage difference between VLD (609) and VREF (636), or VER (612). However, this operation also introduces an extra pole in the feedback loop. This extra pole is compensated using a switched capacitor CD (664), which allows better control on the DC gain as well as the pole location of the sample and hold S/H (534) for achieving overall stability of coil driver 500. Switches S1-S7 inside sample and hold S/H (534) are controlled by two non-overlapping clock signals—S (650) and T (652). Signal S controls switches S1, S3, S5 and S6. Signal T controls switches S2, S4 and S7. For the other circuits including transconductor GM (540), comparators CO1 (550) and CO2 (532), conventional circuit design techniques can be used.

As discussed previously, coil driver 500 is also designed for sending data to an implant using ASK modulation. A low modulation index in the range between 5% and 25% can be used for such implants. Although ASK modulation on primary coil current IL (513) can be achieved by modulating the coil supply VLP (501) according to the digital input DATA (524), a complicated hybrid amplifier for fast settling can be required to drive supply voltage VLP (501) (See, for example, Y. Wu and P. Mok, "*A two-phase switching hybrid supply modulator for polar transmitters with 9% efficiency improvement,*" ISSCC Dig. Tech. papers, pp. 196-197, 2010).

A simpler scheme that does not require any additional discrete components to achieve ASK modulation can be used. It is based on changing the size of switch MS (516) according to digital input DATA. For DATA=1, the size of switch MS (516) remains nominal and the amplitude of primary coil current IL is the amplitude during the normal power transfer operation discussed above. For DATA=0, primary coil current IL (513) is modulated to have a lower amplitude by reducing the size of switch MS (516) for a higher on-resistance (RON), limiting the current flow from supply voltage VLP (501) to primary coil LP (512). However, the voltage across switch MS (516) is non-zero in this case even when switch MS (516) is on. As a result, the power dissipation is higher than the optimal value achieved during the normal power transfer operation. Nevertheless, sending data to an implant may not occur frequently, depending on the application. A technique for data transfer utilizing the tank circuit is to supplement the switch MS (516) with a plurality of switches, wherein the number of switches in the plurality is controlled by or is a function of the digital DATA Input signal which may be modulated by ASK for data transfer.

Figure 7A:
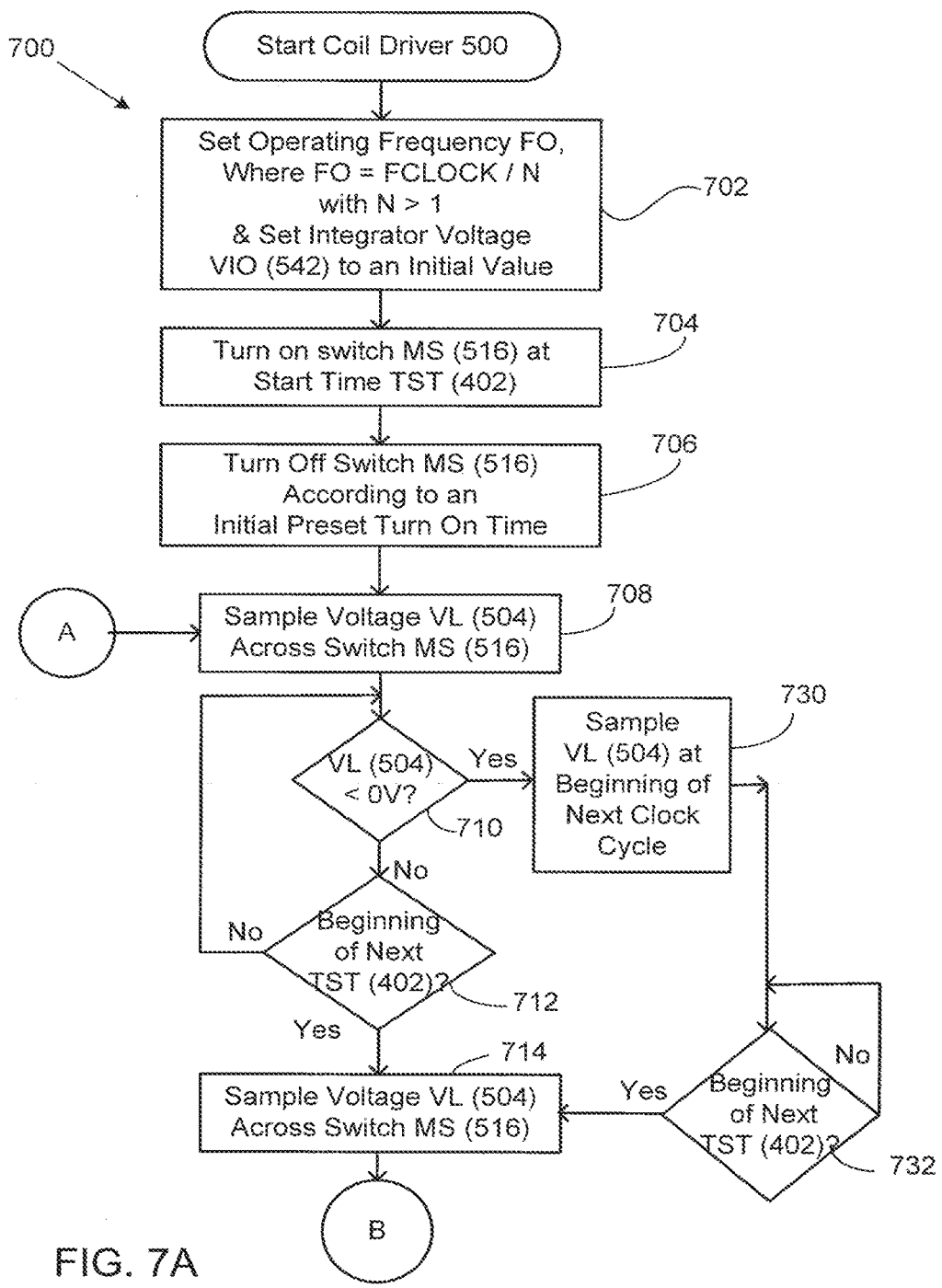
FIGS. 7A-7B is a flowchart showing a method for feedback control of a coil driver for inductive power transfer according to an embodiment of the present invention.
Figure 7B:
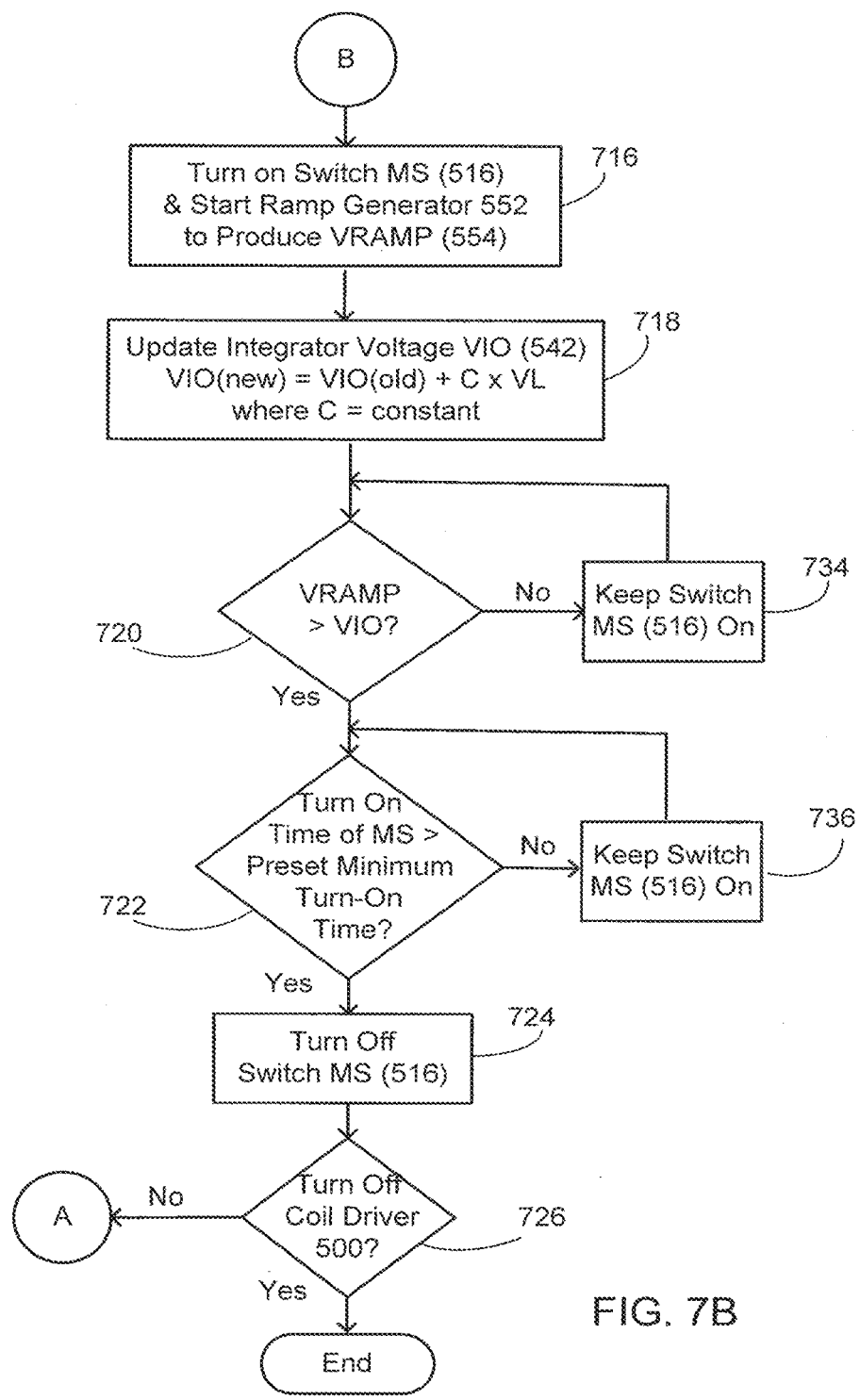

FIGS. 7A-7B is a flowchart 700 showing a method for feedback control of a coil driver, such as coil driver 500 in FIG. 5A, for inductive power transfer according to an embodiment of the present invention. In block 702, a repetitive pulse signal at the operating frequency FO is generated having a frequency of the clock 520 divided by N. Accordingly, N pulses of the clock 520 will occur between consecutive pulses of FO. Integrator voltage VIO (542) is set to an initial value. Flow proceeds to block 704, where switch MS (516) is turned on at turn on start time TST, which is the time at which the leading edge of switch voltage VSW (503) occurs. Switch voltage VSW (503) is the pulse signal generated in block 702. Flow proceeds to block 706.

In block 706, switch MS (516) is turned off according to an initial preset turn on time. Flow proceeds to block 708 where the feedback controlled coil driver protocol commences. In block 708, the coil driver output voltage VL (504) across switch MS (516) is sampled. Flow proceeds to block 710. In block 710, the voltage VL (504) is examined to determine whether it is less than 0 volts. If VL is equal to or greater than 0 volts, flow proceeds to block 712. If VL is less than 0 volts, flow proceeds to block 730.

In block 712, a test for the beginning of the next consecutive turn on start time TST occurs. If the next consecutive turn on start time TST has not occurred, then flow returns to block 710. Blocks 710 and 712 comprise a continuous or repetitive loop until the next turn on start time TST occurs.

In block 730, coil driver output voltage VL (504) is sampled at the beginning of the next clock 520 cycle. In other words, VL is sampled at the occurrence of the next pulse in the pulse train defining clock 520. No more than N clock pulses will occur before a TST occurs. Flow proceeds to block 732, where a test for the beginning of the next turn on start time TST occurs. If the next turn on start time TST has not taken place, then flow returns to block 732. If the next turn on start time TST has occurred, then flow proceeds to block 714, where voltage VL (504) is sampled and flow proceeds to block 716.

In block 716, switch MS (516) is turned on, ramp generator 552 starts to generate VRAMP (554). Flow proceeds to block 718, where integrator voltage VIO (542) is updated based on the equation VIO (new)=VIO (old)+C×VL, where C is a constant. Flow proceeds to block 720.

In block 720, the output of ramp generator 552 VRAMP (554) is examined to determine whether it is greater than integrator voltage VIO. If VRAMP is less than or equal to VIO, then flow proceeds to block 734, where switch MS (516) is kept on and flow returns to block 720. If VRAMP is greater than VIO, then flow proceeds to block 722.

In block 722, the turn on time of switch MS (516) is tested to see if it is greater than a preset minimum turn on time. If the turn on time of switch MS (516) is not greater than the preset minimum turn on time, then flow proceeds to block 736, where switch MS (516) is kept on and flow proceeds back to block 722. If the turn on time of switch MS (516) is greater than a preset minimum turn on time, then flow proceeds to block 724, where switch MS (516) is turned off and flow proceeds to block 726. The blocks 722 and 724 are precautionary in nature to compensate for a situation when TON may be considered too short, as shown in FIG. 4D, for proper circuit operation. However, with comparator (532) and the associated circuits operating as contemplated, the on time TON will be adjusted correctly and blocks 722 and 724 may be eliminated.

In block 726, a test occurs to determine if coil driver 500 should be turned off. If coil driver 500 is to be turned off, then method 700 ends. If coil driver 500 is not to be turned off, then flow returns to block 708.

Although the preceding description describes various embodiments of the system, the invention is not limited to such embodiments, but rather covers all modifications, alternatives, and equivalents that fall within the spirit and scope of the invention. Since many embodiments of the invention can be made without departing from the spirit and scope of the invention, the invention resides in the claims hereinafter appended.

What is claimed is:

1. A feedback controlled coil driver (500) comprising:
   an LC tank circuit (512, 514);
   a direct current power source (501) coupled to the LC tank circuit;
   a switch (516) interconnected between the LC tank circuit and ground to
   switchably couple the LC tank circuit between the power source and ground when the switch is turned on, wherein the interconnection between the LC tank circuit and the switch provides a coil driver output voltage VL (504);
   a sample and hold circuit (534) arranged to monitor the VL;
   an integrator circuit (541) configured to provide a voltage VIO (542) equal to the integral over time of a difference between the sampled VL and a prescribed reference voltage (536);
   a voltage ramp generator (552) arranged to provide a ramp voltage (554) at such time when the switch couples the LC tank circuit to ground;
   a first comparator (550) arranged to compare VIO to the ramp voltage; and a switch driver (525) coupled to the first comparator and arranged to turn the switch off when the ramp voltage exceeds VIO.

2. The feedback controlled coil driver of claim 1 wherein the sample and hold circuit monitors and holds the VL at an instant TON (404) when the switch is turned on.

3. The feedback controlled coil driver of claim 2 wherein the voltage ramp generator commences generating a ramp voltage at the instant when the switch is turned on.

4. The feedback controlled coil driver of claim 3 further comprising a first repetitive pulse signal generator (522) coupled to the switch driver and configured to provide a repetitive pulse signal (503) at a first prescribed frequency (FO), wherein the pulses each have a turn on start time (TST) and wherein the switch driver causes the switch to turn on at each consecutive TST.

5. The feedback controlled coil driver of claim 4 wherein the prescribed reference voltage is zero volts.

6. The feedback controlled coil driver of claim 4 further comprising a second comparator (556) arranged to compare the VL to ground and configured to cause the sample and hold circuit to sample and hold the VL when the VL is less than ground.

7. The feedback controlled coil driver of claim 6 further comprising a second repetitive pulse signal generator configured to provide a second repetitive pulse signal (520) at a second prescribed frequency being greater than the first prescribed frequency and wherein the second comparator causes the sample and hold circuit to sample and hold the VL at an occurrence of a selected pulse in the second repetitive pulse signal.

8. The feedback controlled coil driver of claim 7 wherein the selected pulse is defined between consecutive TST's at the instant when the VL is less than zero.

9. The feedback controlled coil driver of claim 8 wherein the switch comprises a plurality of switches wherein the number of switches in the plurality is a function of a data input signal modulated by amplitude shift keying for data transfer utilizing the tank circuit.

10. A method of driving a coil in an LC circuit comprising the steps of:
providing an LC tank circuit (512, 514) configured to generate an output voltage (VL);
switching the LC tank circuit between a power source (501) and ground at controlled times;
monitoring the VL and integrating over time the difference between the VL and a preselected reference voltage, to provide an integrated difference voltage (VIO (542));
providing a ramp voltage (554) commencing when the LC tank circuit is connected between the power source and ground; and
disconnecting the LC tank circuit from ground when the ramp voltage exceeds VIO.

11. The method of claim 10 further comprising the step of providing a first repetitive pulse signal at a first frequency (FO), wherein the pulses each have a turn on start time (TST) and a pulse duration TON (404).

12. The method of claim 11 further comprising the step of connecting the LC tank circuit to ground at each consecutive TST.

13. The method of claim 12 wherein the step of monitoring further comprises the step of monitoring and holding the VL at the instant when the LC tank circuit is connected to ground.

14. The method of claim 13 further comprising the step of monitoring and holding the VL when the VL is less than ground.

15. The method of claim 14 further comprising the steps of:
providing a second repetitive pulse signal (520) having a frequency greater than the frequency of the first repetitive pulse signal; and
monitoring and holding the VL during a pulse in the second repetitive pulse signal occurring between consecutive TST's at an instant VL is less than zero.

16. A feedback controlled coil driver circuit comprising:
an LC tank circuit (512, 514) having an output voltage (504);
a switch (516) configured to switchably couple the LC tank circuit between a power source (501) and ground;
a repetitive pulse signal generator (522) coupled to the switch, a pulse signal (503) generated by the pulse signal generator, having a controllable on time (404), wherein during such on time, the switch couples the LC tank circuit between the power source and ground; and
a feedback controller (530) configured to provide a control signal (556) to control the on time of the pulse signal, the control signal comprising an integral over time, of a difference between the output voltage and a reference voltage (536) as influenced by a preselected ramp voltage (554).

17. The coil driver circuit of claim 16, wherein the feedback controller comprises a sample and hold circuit (534) configured to sample and hold the value of a sampled output voltage (538) at the instant when the switch is turned on; and an integrator circuit (541) configured to integrate the difference between the sampled output voltage and a preselected reference voltage to thereby provide an integrator circuit output voltage 542.

18. The coil driver circuit of claim 17, wherein the feedback controller further comprises a voltage ramp generator (552) arranged to commence providing a ramp voltage (554) when the switch couples the LC tank circuit between the power source and ground; and a first comparator (550) arranged to compare the integrator circuit output voltage and the ramp voltage for providing the control signal and wherein the control signal influences the pulse signal on time to cause the LC tank circuit to be decoupled between the power source and ground when the ramp voltage exceeds the integrator circuit output voltage.

19. The coil driver circuit of claim 18, wherein the feedback controller further comprises a second comparator (532) arranged to compare the output voltage to ground and configured to cause the sample and hold circuit to sample and hold the output voltage when the output voltage is less than ground.

20. The coil driver circuit of claim 19, wherein the reference voltage is zero volts.

* * * * *